United States Patent [19]

Presnick

[11] Patent Number: 5,240,317

[45] Date of Patent: Aug. 31, 1993

[54] KNOCK-DOWN SKELETAL CABINET

[76] Inventor: Michael C. Presnick, 45 E. End Ave., New York, N.Y. 10028

[21] Appl. No.: 817,726

[22] Filed: Jan. 7, 1992

[51] Int. Cl.⁵ .............................................. A47B 43/00
[52] U.S. Cl. .................................. 312/263; 312/111; 312/140
[58] Field of Search .................... 312/263, 265.1, 107, 312/111, 140

[56] References Cited

U.S. PATENT DOCUMENTS

| | | | |
|---|---|---|---|
| 3,604,775 | 9/1971 | Anderson | 312/265.1 |
| 3,736,035 | 5/1973 | Brown et al. | 312/140 |
| 3,901,572 | 8/1975 | Litchfield | 312/140 |
| 4,045,104 | 8/1977 | Peterson | 312/263 |
| 4,108,520 | 8/1978 | Litchfield | 312/111 |
| 4,274,688 | 6/1981 | Backy | 312/140 |
| 4,279,455 | 7/1981 | Santo | 312/263 |
| 4,807,948 | 2/1989 | Baus | 312/140 |

FOREIGN PATENT DOCUMENTS 1431046  4/1976  United Kingdom ............ 312/140 R

*Primary Examiner*—Victor N. Sakran
*Attorney, Agent, or Firm*—Schweitzer Cornman & Gross

[57] ABSTRACT

A knock-down skeletal cabinet comprising: a bottom wall element, a first end wall element, a second end wall element and a top wall element, each having integral front and rear molding rail elements extending along the entire length thereof; said front molding rail elements being hollow and including locking slot means proximate to the ends thereof; said rear molding rail elements being hollow and having locking slot means formed proximate to the ends thereof and further including projecting flange means extending perpendicularly to the plane of said wall elements; rigid corner connectors having legs disposed at right angles to one another and including locking tab means on each of said legs; said connectors being disposed within the ends of the molding rails on each of said wall elements and interconnecting said wall elements to form a skeletal parallelpiped cabinet.

5 Claims, 2 Drawing Sheets

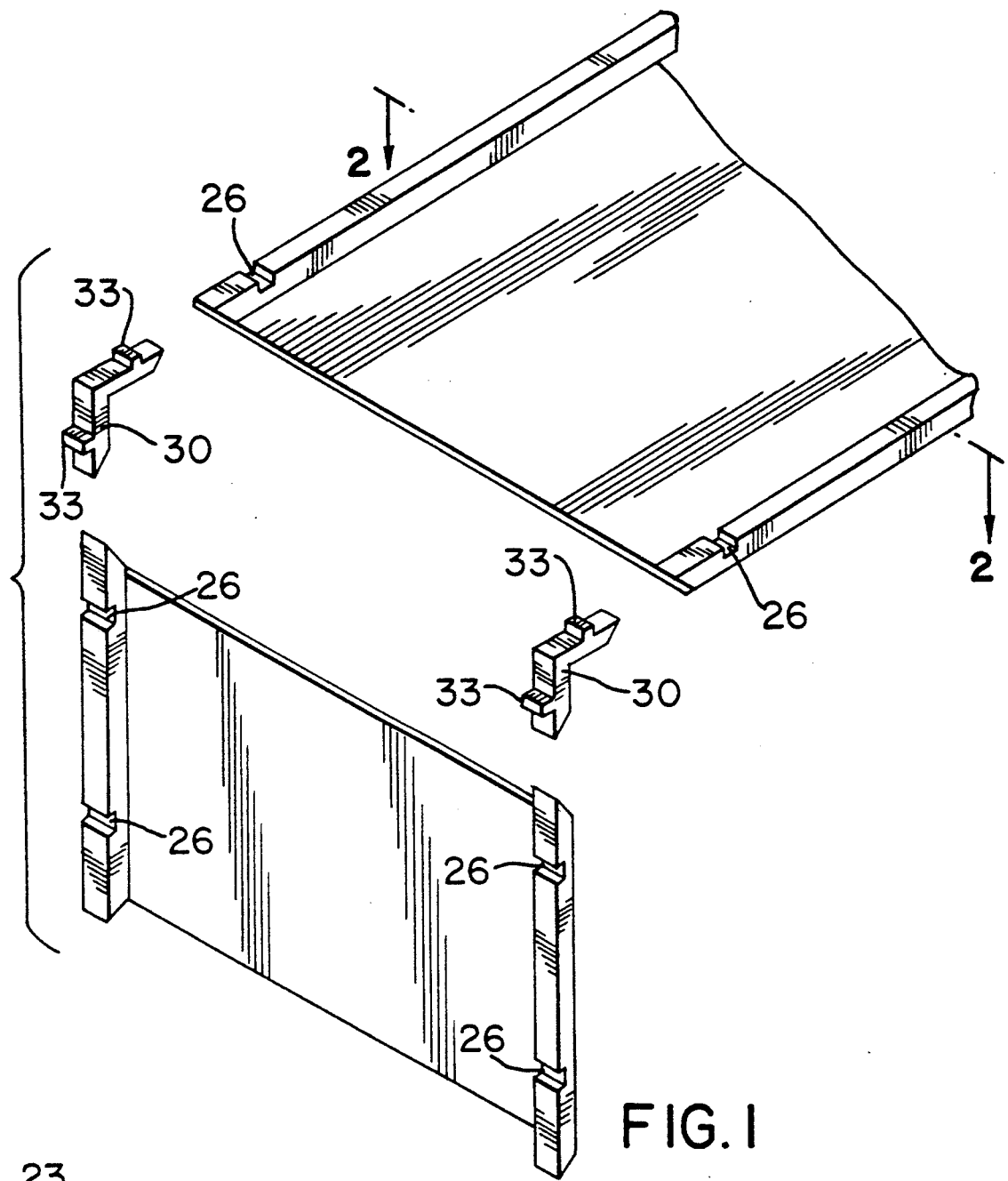
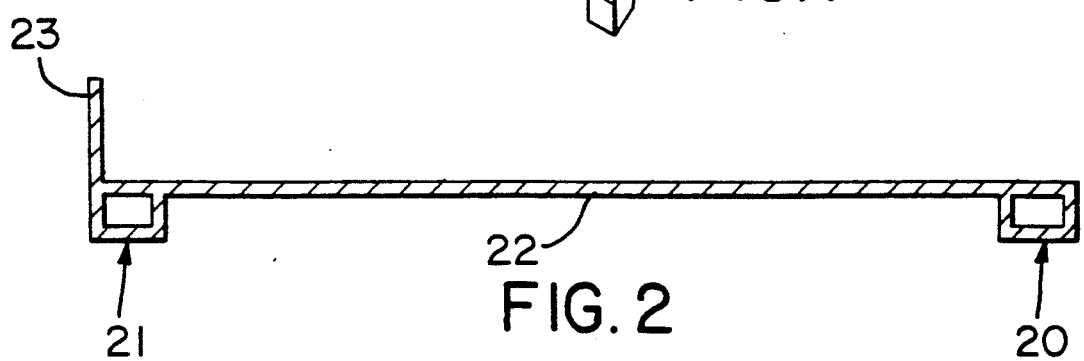

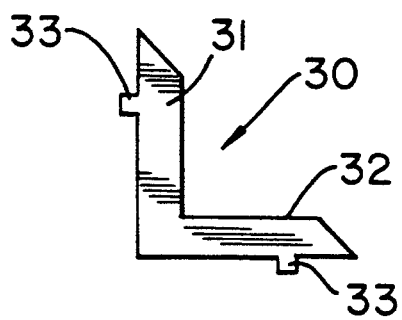 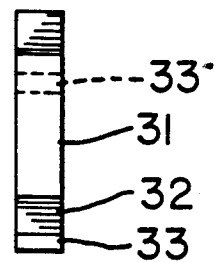
FIG. 3   FIG. 4
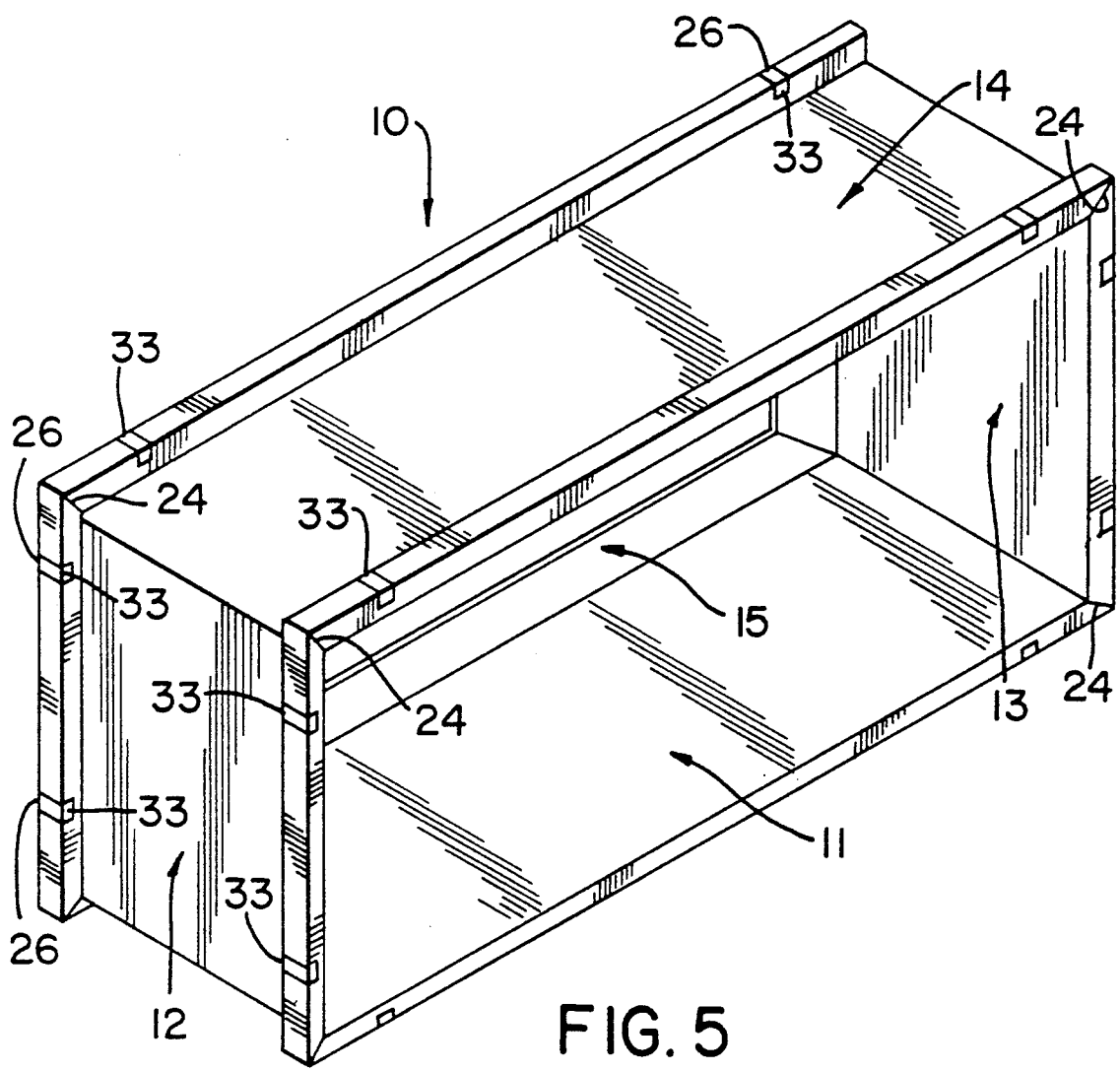
FIG. 5

KNOCK-DOWN SKELETAL CABINET

BACKGROUND OF THE INVENTION

With the proliferation of video cassettes, compact disks and audio cassettes for home entertainment usage a concomitant development of cabinets and storage devices for these materials has been developed. These cabinets and storage devices have typically been in the form of conventional miniaturized cabinets as well as conventional miniaturized carrying cases. These storage products for compact discs, video tapes and audio cassettes have been fabricated from readily available materials such as wood, metals, and plastics.

SUMMARY OF THE PRESENT INVENTION

The present invention is directed to a new and improved skeletal cabinet which may be shipped and sold as a knock-down kit for subsequent assembly, without tools, by unskilled consumers.

The new knock-down skeletal cabinet is fabricated from four major wall elements cut to the length from a unique plastic extrusion, which extrusion includes wall portions bordered by front and rear molding rails and a rear flange extending from the rear molding rail. The major wall elements define the top, bottom and end walls of the assembled cabinet. Each of the major wall elements are interconnected at its corner by a rigid right angled connector which is inserted into the molding portions of the extrusion and is permanently assembled thereto by way of a keyed connection.

The finished cabinet may be sized to house one or more types of media or a combination thereof. The finished units may be stacked one upon the other, if necessary or desired, to house an even greater quantity of compact discs, video tapes or audio tapes.

For a more complete understanding of the present invention and a better appreciation of its attendant advantages, reference should be made to the following detailed description taken in conjunction with the accompanying drawings.

DESCRIPTION OF THE DRAWINGS

FIG. 1 is an exploded perspective view showing the interrelationship of two contiguous wall elements of the new knock-down cabinet with right angled corner connectors interposed therebetween;

FIG. 2 is a cross sectional view taken along line 2—2 of FIG. 1, showing the profile of the extruded major wall elements and molding rails of the invention;

FIG. 3 is a plan view of the corner connector shown in FIG. 1;

FIG. 4 is an end view of the corner connector; and

FIG. 5 is a perspective view of a knock-down skeletal cabinet assembled into parallelpiped configuration in accordance with the principles of the invention.

DESCRIPTION OF A PREFERRED EMBODIMENT

Referring now to FIG. 5, the new and improved skeletal cabinet of the present invention is indicated generally by reference numeral 10 and includes a bottom wall 11, a first end wall 12, a second end wall 13 and top wall 14. A skeletal rear wall 15 is formed by flanges projecting from the rearmost portions of the major wall elements 11-14 as will be explained in greater detail hereinafter. By way of example, the dimensions of the wall elements 12 and 13 are generally five inches by five inches when the cabinet 10 is designed to accommodate a large number of standard compact discs. The total number of discs is limited by the length of the cabinet which in turn is determined by the length of the top and bottom major wall elements 11 and 14 as will be understood. Advantageously, for a five inch deep cabinet the wall elements 11 and 14 will be approximately fifteen inches in length.

In accordance with the principles of the invention, each of the major wall elements 11, 12, 13 and 14 is formed by an extrusion having the cross section shown in FIG. 2. Specifically, the extrusion comprises a front molding rail 20, a rear molding rail 21, and a interconnecting planar wall portion 22. More specifically, the front molding rail is hollow and has a generally rectangular cross section as is the case with the rear molding 21. Pursuant to the principles of the invention, a flange wall 23 extends perpendicularly to the planar wall portion 22 and projects from the rear molding rail 21 as shown. The extrusion of FIG. 2 may be appropriately cut into the required length of the wall elements 11-14 to form a cabinet 10 of desired dimensions. Advantageously, each of the wall elements 11-14 is cut in a mitered fashion as illustrated in FIG. 1 so that the front and rear moldings 20, 21 are joined in eight mitered joints (as shown in FIG. 5) when the knock-down unit is assembled. Alternatively, the individual major wall elements may be square cut and the interconnection of the walls may be in the form of an appropriate butted or squared joint as will be understood.

In accordance with the invention, locking slots 26 are milled or cut in the moldings 20 and 21 proximate to the corners of each of the wall units 11-14 as shown in FIGS. 1 and 5.

In accordance with the invention, the knock-down skeletal cabinet 10 may be completely assembled by simply snapping together the four wall elements 11-14 utilizing eight L-shaped corner connectors 30. Each of the connectors 30 is a right angled one-piece member having legs 31 and 32 perpendicularly aligned with one another, each leg including a rectangular locking tab or tooth 33 projecting therefrom as shown in FIGS. 3 and 4.

In accordance with the invention, the wall elements 11-14 are made from a plastic material, such as polyethylene, polypropylene or the like which is sufficiently rigid to retain the parallelpiped form of the finished cabinet 10 but is also sufficiently flexible to accommodate the forced insertion of the corner connectors 30 into the open moldings 20, 21 and to permit the locking tabs 33 to engage the locking slots 26 as will be understood in order for the wall elements to be snapped together. With each of the eight corner connectors inserted into the moldings 20, 21 at the corners of the assembled cabinet 10, the unit is rigidified and permanently assembled as will be understood.

It is to be appreciated that extrusion of the major wall elements 11-14 is the preferred method of their manufacture and that great economies may be realized by the employment of this technique for producing the wall elements having integral molding rails and rear flanges. However, in certain special circumstances other manufacturing techniques may be employed. Similarly, while the shape of the extrusion has been shown in a preferred embodiment it will be understood that the cross sectional wall extrusion configurations and corner connector may be varied slightly without departing from the scope and the spirit of the invention.

Accordingly, it is to be understood that the foregoing disclosure is intended to be representative of the principles of the present invention and that various changes and modifications may be made therein by those skilled in the art without departing from the clear teachings of this disclosure. Therefore, reference should be made to the following appended claims to determine the full scope of the present invention.

I claim:

1. A knock-down skeletal cabinet assembled from four pieces having an identical cross section and eight identical corner connectors comprising:
   (a) a bottom wall element, a first end wall element, a second end wall element and a top wall element, each having integral front and rear molding rail elements extending along the entire length thereof; each of said elements being extruded from a single die;
   (b) said front molding rail elements being hollow and including locking slot means proximate to the ends thereof;
   (c) said rear molding rail elements being hollow and having locking slot means formed proximate to the ends thereof and further including projecting flange means extending perpendicularly to the plane of said wall elements;
   (d) said corner connectors being rigid and having legs disposed at right angles to one another and including locking tab means on each of said legs;
   (e) said connectors being disposed within the ends of he molding rails on each of said wall elements and interconnecting said wall elements to form a skeletal parallelpiped cabinet.

2. A knock-down skeletal cabinet of claim 1 in which
   (a) said wall elements and said connector elements are fabricated from thermoplastic material.

3. A knock-down skeletal cabinet of claim 1 in which
   (a) said molding rails are generally rectangular in cross section.

4. A knock-down skeletal cabinet of claim 1 in which
   (a) said wall elements are interconnected in mitered joints.

5. A knock-down skeletal cabinet of claim 1 in which
   (a) said slot means is generally rectangular; and
   (b) said tab means is generally congruent with said slot means.

* * * * *